(No Model.)
M. MAGUIRE.
FISH LINE REEL.
No. 335,600. Patented Feb. 9, 1886.
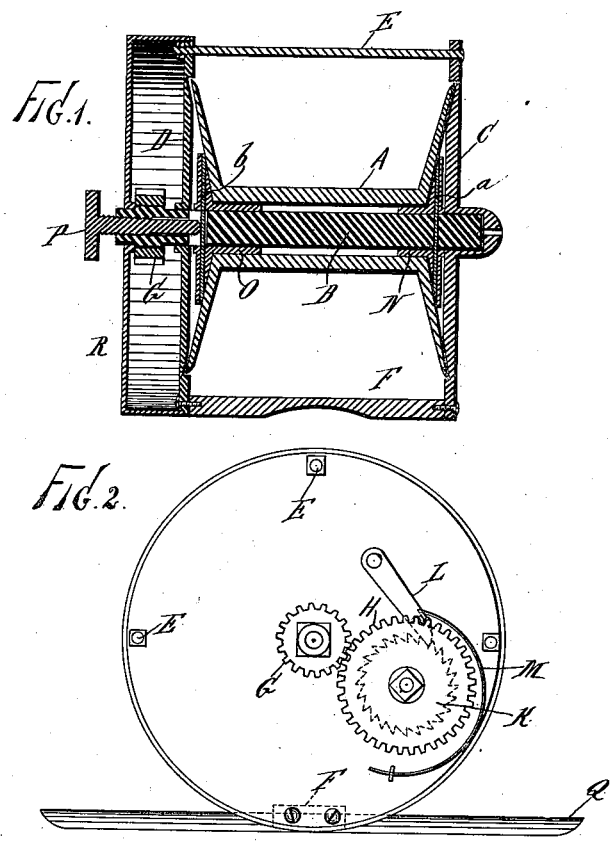
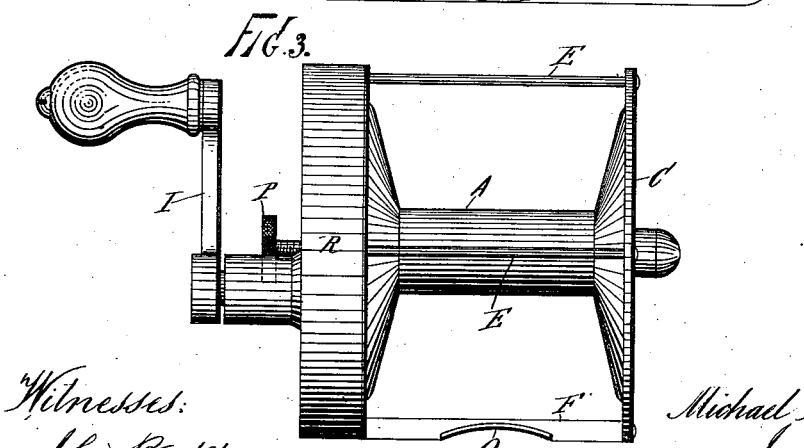
Witnesses:
Shw Buckles,
L. H. Osgood,
Michael Maguire,
Inventor:
By Worth Osgood
Attorney.

UNITED STATES PATENT OFFICE.

MICHAEL MAGUIRE, OF NEW YORK, N. Y.

FISH-LINE REEL.

SPECIFICATION forming part of Letters Patent No. 335,600, dated February 9, 1886.

Application filed May 6, 1885. Serial No. 164,538. (No model.)

*To all whom it may concern:*

Be it known that I, MICHAEL MAGUIRE, of New York city, county of New York, and State of New York, have invented certain new and useful Improvements in Fish-Line Reels, of which the following is a full, clear, and exact description, reference being had to the accompanying drawings, and to the letters of reference marked thereon.

My invention has special relation to that class of implements intended to be employed in connection with fish-poles, and ordinarily known as "fish-line reels," or "fishing-reels," and used for the purpose of reeling in or permitting the paying out of the fish-line; but, as will be readily understood, my improvements may also be applied to other reels or to any analogous devices or mechanism.

The object of my invention is to produce a reel of the class named which shall be simple, cheap, durable, and effective in construction, and wherein provision is made for regulating the rapidity with which the line may be paid out or run off the reel, and this without interfering in any way with the rapidity and facility with which the line may be reeled.

To accomplish all of this, my improvements involve certain novel and useful arrangements or combinations of parts, peculiarities of construction, and principles of operation, which will be herein first fully described, and then pointed out in the claims.

In the accompanying drawings, forming part of this specification, I have represented a reel constructed and arranged for operation in accordance with my invention and involving the principles thereof, in which drawings—

Figure 1 is an axial section and partial elevation showing the friction producing and regulating appliances; Fig. 2, an end elevation with the cap or cover removed, showing the location and arrangement of the detent and the operating-gears, and Fig. 3 a side elevation showing the complete reel.

In all these figures like letters of reference, wherever they occur, indicate corresponding parts.

A is the spool or drum upon which the line is wound. This spool is supported upon a shaft, B, which is journaled in the end plates, C D, the latter being coupled together by rods E E and F, the distance between the plates being such that the spool may move slightly between them in the direction of its axis and upon the shaft B. Upon the shaft B is a gear-wheel, G, into which meshes a larger wheel, H, the latter being turned by any suitable crank, as I. The relative sizes of G and H are such as to multiply the motions of the shaft B as compared with those of the crank I.

Connected with the shaft of the crank I is a ratchet-wheel, (represented in dotted lines at K, Fig. 2,) with which wheel a pawl, L, actuated by a spring, M, engages and operates to prevent the crank and the attached wheel H from being turned backward, but permitting it to be turned forward or in the direction to wind up the line upon the spool. Two flanged collars, N and O, are applied upon the shaft B and arranged to bear against the ends of the spool, the collar N being keyed or otherwise secured to the shaft, as by a key or pin, $a$, and the collar O being also keyed, as by a key or pin, $b$, passing through a slot of considerably greater width than the said pin or key, as shown in Fig. 1. One end of the shaft B is tapped and threaded, and admits the screw P, the inner end of which bears against the pin or key $b$. By turning the screw P into its greatest limit it is plain that the collar O will thus be crowded against the end of the drum A, and the drum in turn crowded against the flanged collar N, as shown in Fig. 1, and the drum can then turn independently of the shaft only as rapidly as the friction between the drum and the collars will permit, for the collars cannot turn unless the shaft B is permitted to turn. By loosening the screw P the friction between the parts is reduced, and thus by loosening or tightening the screw P the amount of friction can be regulated at pleasure or as may be desired. To wind up the line, the crank I is turned in the direction permitted by the pawl L, and this causes the spool to turn in the proper direction. When the line is allowed to run out or off the spool, the spool must turn in the opposite direction, and cannot turn the shaft with it, because it (the shaft) is held from so turning by the pawl L and the gears G H. In order, then, to regulate the velocity with which the line may be unwound, it is only necessary to adjust screw P in accordance with circumstances. However the screw P may be adjusted at the time it is required to reel in the line, the spool may be turned by use of the crank I with uniform facility. The screw P is shown as having a small milled head for convenience of turning it with the thumb and finger; but it may obviously be provided with a crank or any other convenient means of adjustment.

At Q is the ordinary base for securing the reel upon a pole, and at R is the cap or cover by which the gears and the detent are protected.

Various means of securing the friction-collars upon the shaft may be adopted and still be within the limits of my invention; and so, also, the means for preventing backward turning of the central shaft may be variously modified.

When constructed substantially in accordance with the foregoing explanation, the improved reel will be found in practice to admirably answer the purposes or object of the invention as previously set forth.

Heretofore the fish-line has been passed around a loose pulley after leaving the main spool of the reel, and also a spring has been employed for engaging with the main spool, or some part connected therewith, and operating thereon when said spool is being turned forward as well as when turned backward. I make no claim to either of these constructions, nor yet to any means of connecting the crank with the gears which operate the reel in such manner that the spool is free to turn in the direction to unwind the line, while forced to turn with greater or less certainty when the crank is moved in the proper direction.

The operation of my improvement, as above explained, is to regulate the speed with which the line may be run out without interfering with the crank-connections in any way.

Having now fully described my invention, what I claim as new, and desire to secure by Letters Patent, is—

1. In a reel of the character herein set forth, the drum or spool supported upon the central shaft between the two friction-collars, and made movable or adjustable upon said shaft, one of said collars being made adjustable, and both mounted upon and combined with the shaft, substantially as and for the purposes set forth.

2. In combination with the central shaft and the spool or drum supported thereon, the adjustable friction-collar having the cross pin or key, and a screw bearing against said pin, adapted to move the same, or permit the same to move within the slot provided for it in the shaft, substantially as and for the purposes set forth.

3. The herein-described reel, composed of the drum mounted and made movable upon a central shaft, the central shaft, the friction-collars, mechanism for regulating the friction between said drum and collars, the crank, the connecting gear-wheels, and a detent operating to prevent backward or reverse movement of the shaft, substantially as and for the purposes set forth.

In testimony that I claim the foregoing I have hereunto set my hand in the presence of two witnesses.

MICHAEL MAGUIRE.

Witnesses:
PATRICK FITZSIMONS,
G. W. WHEELER.